(12) United States Patent
Park et al.

(10) Patent No.: US 10,281,298 B2
(45) Date of Patent: May 7, 2019

(54) WHEEL LOCALIZATION FROM REFERENCE MAGNETIC FIELD AND ANGULAR ROTATION INFORMATION IN TPMS APPLICATION

(71) Applicant: Infineon Technologies AG, Neubiberg (DE)

(72) Inventors: Jooil Park, Sungnam (KR); Thomas Lange, Munich (DE); Maximilian Werner, Fischach (DE); Guan Lifeng, Singapore (SG); Thomas Lemense, Farmington, MI (US); Michael Kandler, Sauerlach (DE)

(73) Assignee: Infineon Technologies AG, Neubiberg (DE)

( * ) Notice: Subject to any disclaimer, the term of this patent is extended or adjusted under 35 U.S.C. 154(b) by 339 days.

(21) Appl. No.: 15/217,245

(22) Filed: Jul. 22, 2016

(65) Prior Publication Data
US 2018/0023977 A1 Jan. 25, 2018

(51) Int. Cl.
| G01D 5/14 | (2006.01) |
| B60T 8/171 | (2006.01) |
| G01D 5/165 | (2006.01) |

(52) U.S. Cl.
CPC .............. *G01D 5/145* (2013.01); *B60T 8/171* (2013.01); *G01D 5/165* (2013.01); *B60T 2240/03* (2013.01)

(58) Field of Classification Search
CPC combination set(s) only.
See application file for complete search history.

(56) References Cited

U.S. PATENT DOCUMENTS

| 4,651,290 A | 3/1987 | Masaki et al. |
| 4,761,741 A | 8/1988 | Agarwal et al. |
| 5,099,443 A | 3/1992 | Higashimata et al. |
| 7,487,671 B1 | 2/2009 | Zhu et al. |
| 7,646,195 B2 | 1/2010 | Salfelner |

(Continued)

FOREIGN PATENT DOCUMENTS

WO 2006100577 A1 9/2006

OTHER PUBLICATIONS

Non-Final Office Action dated Feb. 10, 2014 for U.S. Appl. No. 13/738,502.

(Continued)

*Primary Examiner* — Jay Patidar
(74) *Attorney, Agent, or Firm* — Eschweiler & Potashnik, LLC

(57) ABSTRACT

Embodiments may provide a system, a wheel localizer, a wheel localization device, or methods for locating a position of at least one wheel out of a plurality of wheels of a vehicle. In one embodiment, a system comprises a detector that obtains information related to a reference magnetic field in which the at least one wheel rotates, an antilock braking system (ABS) unit that obtains information related to angular rotations of the plurality of wheels, and a locator that determines the position of the at least one wheel based, at least in part, on the information related to the reference magnetic field and the information related to the angular rotations of plurality of wheels, where the position comprises a wheel location from among the plurality of wheels. The reference magnetic field may be the earth's magnetic field.

27 Claims, 10 Drawing Sheets

(56) References Cited

U.S. PATENT DOCUMENTS

| | | |
|---|---|---|
| 8,565,967 B2 | 10/2013 | Steiner |
| 8,593,273 B2 | 11/2013 | Gotschlich et al. |
| 8,843,267 B2 | 9/2014 | Park et al. |
| 8,922,359 B2 | 12/2014 | Lim |
| 9,221,309 B2 | 12/2015 | Kandler |
| 9,701,287 B2 | 7/2017 | Kretschmann et al. |
| 10,017,015 B2* | 7/2018 | Kautzsch ............ B60C 23/0416 |
| 2001/0029423 A1 | 10/2001 | Nishida et al. |
| 2003/0058118 A1 | 3/2003 | Wilson |
| 2005/0065693 A1 | 3/2005 | Wang et al. |
| 2006/0152212 A1 | 7/2006 | Beranger et al. |
| 2010/0256874 A1 | 10/2010 | Carresjo et al. |
| 2010/0256887 A1 | 10/2010 | Linda et al. |
| 2010/0274441 A1 | 10/2010 | Carresjo |
| 2010/0274607 A1 | 10/2010 | Carresjo et al. |
| 2011/0071737 A1 | 3/2011 | Greer et al. |
| 2011/0153174 A1 | 6/2011 | Roberge et al. |
| 2011/0271745 A1 | 11/2011 | Oshiro |
| 2012/0029767 A1 | 2/2012 | Bailie et al. |
| 2013/0166140 A1 | 6/2013 | Steiner |
| 2014/0195107 A1 | 7/2014 | Park et al. |
| 2014/0358320 A1* | 12/2014 | Hammerschmidt .... B60T 8/171 701/1 |
| 2015/0096362 A1* | 4/2015 | Hammerschmidt ........................ G01M 17/025 73/146 |
| 2015/0226643 A1* | 8/2015 | Hammerschmidt ........................ G01M 17/025 73/146.3 |
| 2015/0292970 A1* | 10/2015 | Gando ................. G01L 9/0072 73/724 |

OTHER PUBLICATIONS

Notice of Allowance dated May 29, 2014 for U.S. Appl. No. 13/738,502.

Notice of Allowance dated Jul. 10, 2015 for U.S. Appl. No. 14/469,644.

Non-Final Office Action dated Apr. 3, 2015 for U.S. Appl. No. 14/469,644.

* cited by examiner

WHEEL LOCALIZATION FROM REFERENCE MAGNETIC FIELD AND ANGULAR ROTATION INFORMATION IN TPMS APPLICATION The field of the present disclosure relates to single or multiple axis relative phase measurement of wheel rotation in a Tire Pressure Monitoring Systems (TPMS) application. In particular, the present disclosure relates to a TPMS module using a magnetic field sensor associated therewith and a method for locating a position of at least one wheel out of a plurality of wheels of a vehicle.

BACKGROUND

A TPMS is an electronic system that monitors the air pressure inside a tire on a vehicle. TPMS report real-time tire-pressure information to the driver of the vehicle, either via a gauge, a pictogram display, a low-pressure warning light, or other technique. A TPMS with an auto localization feature is able to locate the exact tire which transmits the data from a tire pressure sensor (TPS) module located in a tire to an electronic control unit (ECU). Conventional systems for auto-localization correlate the phase information of an anti-lock braking system (ABS) wheel speed sensor with phase information received from a TPS module on a system level. A conventional TPS module generates the phase information using information from an acceleration sensor that detects accelaration of the tire in which the TPS is installed.

One approach to auto-localization includes Angular Position Sensing (APS). APS enables a TPMS to calculate the wheel speed and angular position of the wheel in which a TPS is installed based on a set of measured acceleration measurements received from the TPS. The calculated angular position is then correlated with data derived from the vehicle's ABS sensors.

Conventional approaches to APS involve an APS function that is based on measurements from a motion sensor or acceleration sensor. The accuracy of conventional APS functions is dependent on the signal to noise ratio (SNR) between unwanted noisy acceleration signals and desired acceleration signals. Unwanted noisy acceleration signals may be produced by mechanical vibration of the tire or the wheel. The desired acceleration signal in a conventional, acceleration-based system is induced by gravity, and may be within a range of (−1 g, +1 g). Thus, the accuracy of conventional APS is affected by the roughness of the road or other surface the vehicle is driving on, as well as mechanical vibrations from the tire itself. Rough roads may lead to unreliable APS results due to poor SNR, which in turn may result in unusable auto-localization and repeated APS measurements, requiring increased usage of computational resources and energy. Conventional approaches to APS may also require time consuming and costly exhaustive testing of different road conditions. Some conventional approaches oversample the acceleration sensor to overcome poor SNR, but oversampling the acceleration sensor also consumes more energy and computational resources. Furthermore, if a desired SNR cannot be achieved with oversampling, a conventional approach may try to gather new acceleration information, and the calculations may be repeated. Filtering outliers also increases the number of APS trials required by conventional approaches, further increasing the charge consumption of the TPS and also increasing the time required until a localization is successfully calculated.

Conventional approaches to auto-localization using APS are limited to approximately 180 km/h. Centrifugal force in the radial direction of the wheel being measured may cause z-axis acceleration to vary from 0 g to over 1600 g. A z-axis acceleration of 1600 g is associated with a tire speed of 300 km/h. TPMS sensors are expected to operate in conditions in which they have to manage large dynamic acceleration ranges, but conventional TPMS sensors are limited to a maximum acceleration of 500 g, or 180 km/h. Conventional approaches also suffer from a limited resolution of acceleration. Thus, conventional APS have degraded accuracy because the range of desired acceleration signals used for APS is (−1 g~+1 g) while the direct current (DC) offset may reach up to 1600 g. Furthermore, during acceleration or braking of the vehicle, the centrifugal force in the radial direction of the wheel is not constant in time. More complex algorithms may therefore be used by conventional approaches, including DC-offset subtraction and robust optimization, to avoid unreliable APS results. Such complex algorithms result in conventional approaches that use additional computational resources and energy. For example, costly 10-13 bit analog to digital conversion (ADC) implementations with low-noise are required to provide the necessary dynamic range and sufficiently high resolution, while DC offset may be dependent on vehicle speed and may require more complex software, more computation time, and more energy. Conventional approaches thus may lead to increased use of computational resources, increased energy consumption, increased battery size, increased weight, and higher costs.

SUMMARY

Accelerometer-based localization approaches can have limitations regarding the maximum speed at which they can operate effectively. Accelerometer-based localization approaches also are costly and have less than optimal energy efficiency. For example, acceleration sensors used to determine the rotational speed of a wheel depend on the rotational speed of the wheel. However, the relation can be of a quadratic nature, in which doubling the rotational speed of a wheel corresponds to four times the radial acceleration. Therefore, acceleration sensor based systems may be inaccurate or inoperable at higher speeds. Conventional accelerometer-based localization approaches suffer from lower accuracy due to external noise, including mechanical vibration. Embodiments described herein therefore employ a TPS comprising a magnetic field sensor that detects changes in the magnitude of a component of a reference magnetic field as a wheel rotates in the reference magnetic field in order to determine a rotational speed or frequency of the wheel.

Embodiments described herein provide the advantage that magnetic field sensors are not limited to the narrow, less than optimal, range of useful vehicle speeds that accelerometer-based systems are limited to. Since the reference magnetic field does not change with respect to the speed of the vehicle, the magnetic field sensors may be used up to much higher rotational frequencies and consequently up to higher vehicle speeds. For example, conventional acceleration sensor based approaches are limited to a maximum speed of 180 km/h, while example embodiments provide robust, cost efficient, and energy efficient localization up to vehicle speeds of at least 300 km/h. Embodiments may thus facilitate wheel localization more efficiently, with greater accuracy, and with a higher speed limitation than conventional approaches.

Embodiments are further based on a finding that a magnetic field sensor may accurately measure a vehicle's speed without absolute acceleration information, which, in a conventional approach, may be based on a calibration process performed during manufacturing for a specific speed range. A magnetic field sensor may not have to compensate for as severe a DC offset of sinusoidal signals to detect an angular position of a sensor, and may thus be more cost and energy efficient than conventional approaches. Furthermore, magnetic field determination provides the advantage that temperature compensation and calibration may not be needed that would otherwise be needed for an acceleration measurement, since relative measurements may be sufficient for determining a rotational speed of a wheel.

Embodiments make use of information related to the magnitude of a component of a reference magnetic field detected during the rotation of at least one wheel of a vehicle. A vehicle may be any vehicle using tires, including a car, a van, a truck, a bus, a plane, a bicycle, a motorcycle, a trailer, an all-terrain vehicle, or other vehicle. Although many embodiments will be exemplified using a car, any other vehicle can be utilized in embodiments. Embodiments provide a system for locating a position of at least one out of a plurality of wheels of a vehicle. The system comprises a detector configured to obtain information related to a reference magnetic field through which the at least one wheel rotates. The detector obtains information about the magnitude of a component of the reference magnetic field through which the at least one wheel of the vehicle rotates using a magnetic field sensor. The magnitude of the component of the detected reference magnetic field through which the wheel of the vehicle rotates provides an oscillating magnetic field signal as the wheel rotates through the magnetic field. The magnetic field signal may thus be a sinusoidal signal. Information related to an angular frequency or rotational speed of the wheel can be derived from the magnetic field. Moreover, the detection of the magnetic field is not affected by different rotational speeds of the wheel as compared to acceleration sensors. In embodiments, the detector can be implemented as any means for detecting, a detection device, a detection unit, a detection module, or one or more sensors. The magnetic field sensor may be, for example, a GMR (Giant Magnetoresistance) sensor, an AMR (Anisotropic Magnetoresistance) sensor, a TMR (Magneto Tunnel Effect) sensor, a CMR (Colossal Magnetoresistance) sensor, or a Hall-effect sensor. Other types of magnetic field sensors may be employed.

Example embodiments further comprise an ABS unit configured to obtain information related to angular rotations of the plurality of wheels. The ABS unit may be implemented as any means for antilock braking, an antilock brake device, an antilock brake module, and it may comprise antilock braking system sensors or detectors. Thus, in example embodiments, angular rotations of the plurality of wheels can be determined from an ABS.

Example embodiments further comprise a locator that determines the position of the at least one wheel based on the information related to the magnetic field through which the at least one wheel rotates and the information related to the angular rotations of the plurality of wheels. The information related to the magnetic field may include phase information calculated by the detector based on the magnitude of the component of the detected reference magnetic field through which the wheel of the vehicle rotates, or the oscillating magnetic field signal generated as the wheel rotates through the magnetic field. The locator can be implemented as any locating means, such as a locating circuit, a locating device, a locating unit, a locating module, software which is executed on accordingly-adapted hardware, such as a processor, a digital signal processor (DSP), a multipurpose processor, or a controller. The locator may use knowledge of the angular rotations of the plurality of wheels of the vehicle as obtained from the ABS and it may compare these angular rotations to an angular rotation determined from the information related to the magnetic field of the at least one wheel.

By matching the angular rotations determined from the magnetic field with the angular rotations from the ABS, signals with corresponding rotational frequencies can be assigned to each other. Since the positions of the wheels evoking the antilock braking system angular rotations are known, the locator can determine the position of the at least one wheel based on the respective position information from the ABS. The locator may be configured to obtain the position of the at least one wheel further based on predetermined positions associated with the plurality of wheels and the information related to the angular rotations of the plurality of wheels.

In further embodiments, the locator can be configured to determine the position of the at least one wheel by determining information related to a correlation of the information related to the magnetic field through which the at least one wheel rotates and the information related to the angular rotations of the plurality of wheels of the vehicle. In some embodiments the locator may determine a correlation between angular rotations determined based on an ABS and angular rotations determined based on the magnetic field through which the at least one wheel rotates. Determining the correlation may correspond to determining any measure on how the different angular rotations match each other. For example, once an angular rotation is derived from the magnetic field information associated with the at least one wheel, the wheel can be assigned to the position for which the ABS unit indicates an angular rotation of the respective wheel closest to the angular rotation determined from the magnetic field information. In some embodiments, the detector calculates a phase information based on information related to the magnetic field through which the at least one wheel rotates. In another embodiment, the locator receives, from the detector, the information related to the magnetic field, and calculates the phase information based on the information related to the magnetic field provided by the detector.

In further embodiments, the ABS unit may comprise one or more ABS sensors configured to obtain information related to the angular rotations of the plurality of wheels. In one embodiment, indicators may be mounted on the wheel rim, which can be sensed from the chassis of the vehicle as the wheel rotates. Such indicators may be optical indicators, magnetic indicators, or electrical indicators. The sensors may then correspond to optical sensors, magnetic sensors, or electrical sensors. In some embodiments, one implementation may use a rotating plate or a disc, having correspondingly adapted gaps through which an optical signal can be obtained. As the ABS has this sensor assigned to a certain position, it is already known from which position on the vehicle the angular rotation is measured by the antilock braking system.

In one embodiment, the detector obtains information related to a tire pressure of the at least one wheel. The locator associates the information related to the tire pressure with the position of the at least one wheel. Once the position of the wheel has been determined, a tire pressure signal, which may be determined by a pressure sensor from a TPMS, can also be assigned to that position. In some embodiments, information related to the tire pressure and information related to the magnetic field through which the respective wheel rotates may be communicated using the same signal. The signal may comprise an identification (ID), for example, in terms of a unique number assigned to the respective TPMS-sensor. Therefore, the respective tire pressure can be assigned to the location or position as determined by the above described approach. In some embodiments the detector may further comprise a tire pressure sensor. In some embodiments a tire pressure sensor and a magnetic field sensor may be integrated into one device, including a PCB, where the device or combined sensor is also operable to provide measurement results on the magnetic field and the tire pressure in one signal.

In one embodiment, the detector and the locator can be configured to communicate wirelessly. Radio signals may be used to communicate information from the detector to the locator. The detector can be configured to transmit information using a radio signal and the locator can be configured to receive information from the radio signal. For example, some embodiments may use low-frequency radio signals for transmitting the information. In some embodiments, a short range wireless communication standard or system may be used to communicate the information from the detector to the locator. For example, near field communication may be used, including radio frequency identification (RFID), Zigbee, or Bluetooth. Other communications techniques may also be employed. In some embodiments the detector may include transmitter components, such as a transmit antenna or loop, an amplifier, a filter, a mixer, or an oscillator. The locator may include receiver components such as a receive antenna or loop, an amplifier, a filter, a mixer, or an oscillator.

Embodiments provide a wheel localizer for locating a position or a location of at least one out of a plurality of wheels of a vehicle. The wheel localizer may be implemented as one or more chips or integrated circuits. The wheel localizer comprises a detector configured to provide a magnetic field signal. The magnetic field signal comprises information related to a magnitude of a component of the reference magnetic field detected by the at least one wheel of the vehicle. The magnetic field signal may be a sinusoidal signal. In one embodiment, the detector computes a phase information associated with the at least on wheel based, at least in part, on the information related to the magnitude of the component of the reference magnetic field. The magnetic field signal may also comprise the phase information computed by the detector. The wheel localizer includes an ABS unit configured to provide a rotation signal comprising information related to angular rotations of the plurality of wheels. The wheel localizer comprises a locator configured to receive the magnetic field signal and the rotation signal. The wheel localizer is further configured to provide a position signal comprising information related to the position of the at least one wheel based on the magnetic field signal and the rotation signal.

The detector may provide the magnetic field signal and the ABS unit may provide the rotation signal. The locator may then determine an expected rotation signal for the at least one wheel from the magnetic field signal and compare the expected rotation signal with the rotation signal from the ABS unit.

In one embodiment, the locator provides the position signal further based on predetermined positions associated with the plurality of wheels and the information related to the angular rotations of the plurality of wheels. The ABS unit may have predetermined knowledge on which angular rotation relates to which one of the plurality of wheels. Using the predetermined knowledge on the position of the wheel with the angular rotation, this angular rotation can be matched to an expected angular rotation and thus the position can be assigned.

In one embodiment, the detector may comprise a magnetic field sensor for sensing information related to the magnitude of a component of the reference magnetic field as detected at the at least one wheel of the vehicle. The magnetic field sensor may be mounted on the rim of the wheel or in a tire coupled to the rim. The magnetic field sensor may be a one-axis sensor or a multiple axis sensor. The locator can be configured to determine the information related to the position of the at least one wheel by determining information related to a correlation of the information related to the magnitude of the component of the reference magnetic field through which the at least one wheel rotates and the information related to the angular rotations of the plurality of wheels of the vehicle. Correlations may be determined between rotational signals from the ABS and the magnetic field signal directly, or an expected rotational signal may be determined from the magnetic field signal which can be used for the correlation. The ABS unit may comprise one or more ABS sensors to obtain the rotation signal. The locator can be further configured to receive a pressure signal comprising information related to a tire pressure of the at least one wheel. The locator can be further configured to associate the information related to the tire pressure with the position signal, i.e. with the position as determined from the angular rotation and the expected angular rotation. The detector may be further configured to transmit information using a radio signal and the locator may be further configured to receive the information from the radio signal.

Embodiments further provide a wheel localization device for locating a position of at least one out of a plurality of wheels of a vehicle. The wheel localization device comprises one or more inputs for a first signal comprising information related to a magnetic field through which the at least one wheel of the vehicle rotates and for one or more second signals comprising information related to angular rotations of the plurality of wheels. The information related to the magnetic field may include information about the magnitude of a component of the magnetic field in an axis. The information related to the magnetic field may also include phase information related to the at least one wheel. The wheel localization device further comprises an output for an output signal comprising information related to the position of the wheel, wherein the output signal is based on the first signal comprising the information related to the magnetic field through which the at least one wheel of the vehicle rotates and on the one or more second signals comprising the information related to the angular rotations of the plurality of wheels.

In embodiments, the wheel localization device may be implemented as one or more chips or integrated circuits. In some embodiments, the wheel localization device may correspond to one of the above systems on one chip. For example, the wheel localization device may be implemented as an Application Specific Integrated Circuit (ASIC). In embodiments, the output signal may comprise information related to an association of the first signal to one of the angular rotations of the plurality of wheels. In some embodiments the wheel localization device may provide information to which one of the angular rotations from the plurality of wheels the respective magnetic field component magnitude is associated. In one embodiment, the assignment of the position of an angular rotation to the magnetic field component magnitude may be carried out outside the wheel localization device.

Embodiments also provide a method for locating a position of at least one out of a plurality of wheels of a vehicle. The method comprises obtaining information related to a magnetic field through which the at least one wheel rotates. The information may include information about the magnitude of a component of the magnetic field. The information may also include information about the phase of the at least one wheel, where the phase information is based, at least in part, on the information about the magnitude of the component of the magnetic field. The method further comprises obtaining information related to angular rotations of the plurality of wheels. The method further comprises determining the position of the at least one wheel based on the information related to the magnetic field through which the at least one wheel rotates and the information related to the angular rotations of the plurality of wheels.

In further embodiments, the method may also comprise determining the position of the at least one wheel by determining information related to a correlation of the information related to the magnetic field component magnitude of the at least one wheel and the information related to the angular rotations of the plurality of wheels of the vehicle. Embodiments may carry out a correlation between the magnetic field component magnitude and the angular rotations. In further embodiments, the method may further comprise obtaining information related to a tire pressure of the at least one wheel and associating the information related to the tire pressure with the position of the at least one wheel. In one embodiment, the method comprises transmitting information using a radio signal and receiving the information from the radio signal.

Embodiments may further provide a method for determining a magnitude of a component of a reference magnetic field through which a wheel of a vehicle rotates. The method comprises determining information related to a magnetic field through which the wheel rotates and storing information related to the magnetic field. The method further comprises comparing stored information related to a past magnetic field with recent information related to a recent magnetic field. The method further comprises operating the system in a standby mode when the stored information differs from the recent information by less than a predetermined threshold.

Embodiments may provide for localization systems, devices, methods, and sensors that operate at higher speed limits and with greater accuracy than conventional acceleration-based approaches. Moreover, more cost-effective sensors may be used, since magnetic field sensors may not need to be calibrated in order to determine the rotational speed of the wheel. Embodiments allow for a sinusoidal signal may be used to detect an angular position of a sensor, which may have only a low or even no DC offset compared to conventional acceleration-based approaches. Furthermore, temperature compensation and calibration may not be needed for magnetic field measurements in embodiments. Embodiments may only make use of relative measurements.

The present disclosure provides for techniques for APS based auto-localization by replacing the function of the acceleration sensor or shock sensor with a magnetic field sensor that can measure a reference magnetic field. Example systems, methods and apparatus integrate a magnetic field sensor with at least one axis into a TPMS to measure the relative phase information of a wheel rotation.

A magnetic sensor is placed in a wheel. The wheel rotates within the Earth's magnetic field. The sensor senses a component (e.g. Bx, By, or Bz in a three axis x, y, z, co-ordinate system) of the reference magnetic field. The reference magnetic field may be the Earth's magnetic field. As the wheel rotates about an axis (e.g. axis of rotation), the magnitude of the sensed component of the reference magnetic field will change, dependent on the angle of rotation of the wheel, and the orientation of the wheel (direction of travel) with respect to the reference magnetic field. As the wheel rotates, Bx will change in magnitude. A plot of the changes in magnitude Bx as the wheel rotates over time will result in a sinusoidal plot. From the changed component, (e.g. Bx) example embodiments compute the relative phase of the wheels. Example embodiments may also determine the frequency of rotation, from which the speed of the vehicle may be determined. More than one component (e.g. Bx and By, Bx and Bz, By and Bz, or Bx, By, and Bz) may be used to compute the relative phase of the wheel with more accuracy than just one component.

BRIEF DESCRIPTION OF THE DRAWINGS

The accompanying drawings, which are incorporated in and constitute a part of the specification, illustrate various example devices, localizers, apparatus, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale. Optional features are indicated by dashed lines or boxes in the figures.

DETAILED DESCRIPTION

Figure 1:
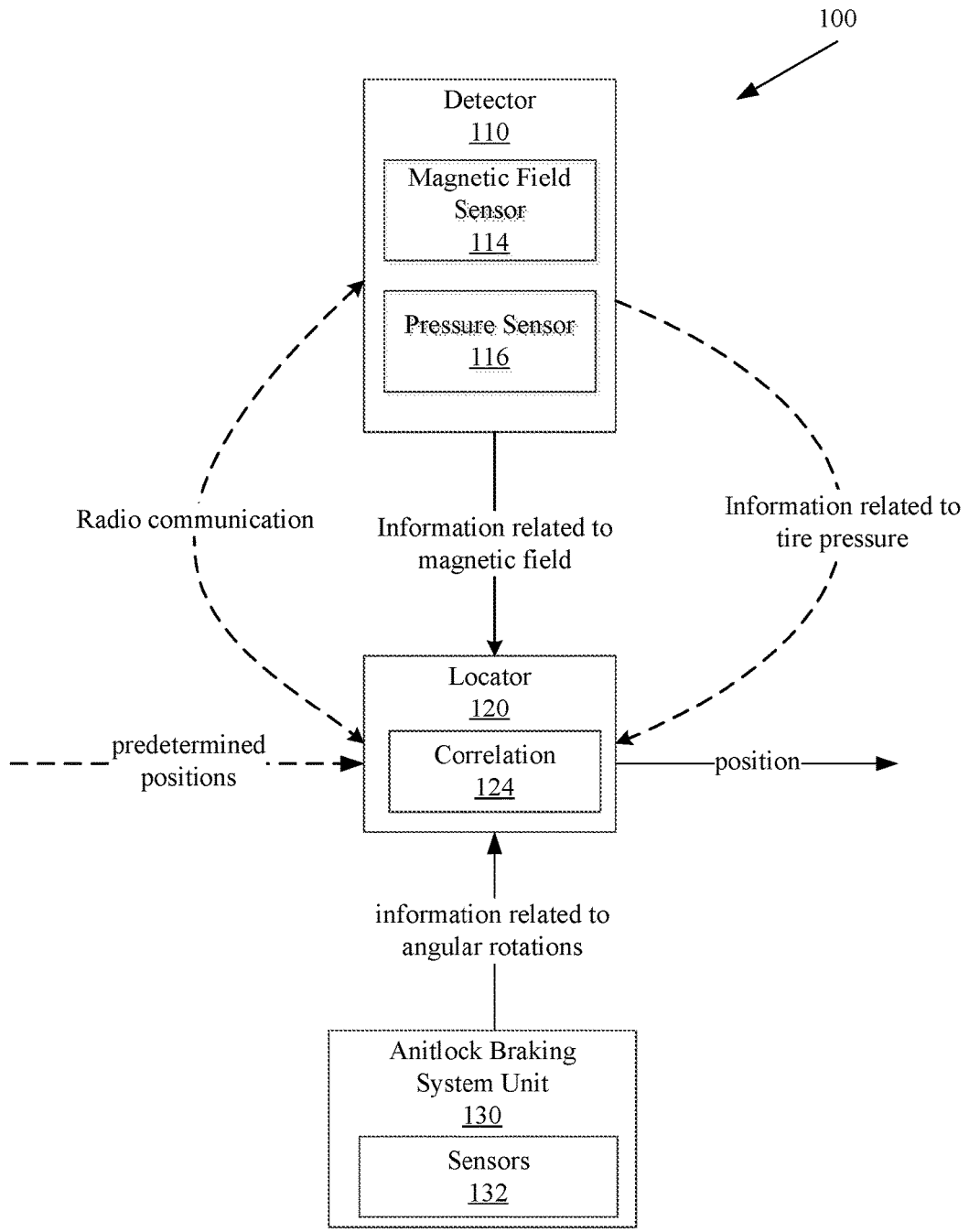
FIG. 1 illustrates an embodiment of a system for locating a position of a wheel.

The Earth's magnetic field is a vector quantity; at each point in space it has a strength and a direction. The earth's magnetic field may be described in part by three orthogonal strength components (e.g.: X, Y, and Z). Embodiments may employ a magnetic field sensor, including a single x-axis magnetic field sensor, a single z-axis magnetic field sensor, a dual axis magnetic field sensor, or a three axis magnetic field sensor to detect a reference magnetic field. The reference magnetic field may be the Earth's magnetic field. Embodiments use the changing magnitude of the vector of the reference magnetic field to detect the rotation of a wheel.

Example embodiments include an APS based auto-localization system that includes a magnetic field sensor that can measure a reference magnetic field, including the earth's magnetic fields with a range of at least (250 mG, 650 mG) Example embodiments described herein, by using a measured component of the reference magnetic field, have a better and more consistent SNR, even in the presence of mechanical vibration, than conventional approaches, because the magnetic field sensor is not itself susceptible to mechanical vibration that vehicle wheels are routinely subjected to. Example embodiments facilitate improved auto-localization of wheels based on angular positions of a wheel sensed up to maximum vehicle speeds greater than conventional accelerometer-based approaches, because the magnetic field sensing is not influenced by centrifugal force dependent on wheel rotation speed. Example embodiments further simplify the computational requirements of the APS auto-localization by eliminating or reducing the DC offset that would otherwise be introduced by the centrifugal force or mechanical noise.

In one embodiment, a single axis (e.g. x-axis) or a multiple axis (e.g. x/z, x/y, x/y/z axis) magnetic field sensor is mounted on a wheel. The wheel may be part of a plurality of wheels of a vehicle. The magnetic field sensor may also be mounted in a tire coupled to the wheel. The magnetic field sensor may be coupled to a printed circuit board (PCB). The mounting orientation of the magnetic field sensor on the wheel may depend on the mounting orientation of the PCB. In one embodiment, the preferred orientation for a single axis magnetic field sensor is in the x-direction or the y-direction. In another embodiment, for a multiple axis magnetic field sensor, the preferred axis combinations include x/z, x/y, or x/y/z. In other embodiments, the magnetic field sensor may be oriented in other axes or combinations of axes. In still other embodiments, the magnetic field sensor may be oriented offset a threshold amount from the x, y, or z axis.

In one embodiment, a signal generated from the measurement of the magnetic field has a phase dependency based on an inclination angle and the vehicle direction $\phi$. The inclination angle is the angle of incidence of the reference magnetic field (e.g. the earth's magnetic field) with respect to the surface on which the vehicle is moving. The inclination angle may vary from (0, 90) degrees depending on where, if the reference magnetic field is the earth's magnetic field, the vehicle is located on the surface of the earth. For example the inclination angle at magnetic south will be different than the inclination angle at the equator, which will be different than the inclination angle in Ohio.

As a vehicle changes direction $\phi$, the sinusoidal signal from the magnetic field sensor may phase shift dependant on the vehicle direction $\phi$. In some locations on the earth (e.g. Germany) the phase shift may be ±20°. Since phase shifts of up to ±40° are acceptable for wheel auto-localization, a single axis magnetic field sensor that experiences a ±20° phase shift is satisfactory. However, in other locations (e.g. India), the phase dependency may be up to ±80°, dependent on the inclination angle. In those situations with a large phase shift, example embodiments may use a multiple axis magnetic field sensor. When using a multiple axis magnetic field sensor, example embodiments may calculate the amplitude of the magnetic field signal using a square root of the sum of squares of all signals (e.g. x/z signal). By using a multiple axis magnetic field sensor, example embodiments facilitate measuring the reference magnetic field with sufficient accuracy even in situations of large phase shifts. In other embodiments, the amplitude of the magnetic field signal may be calculated using other approaches.

Figure 7:
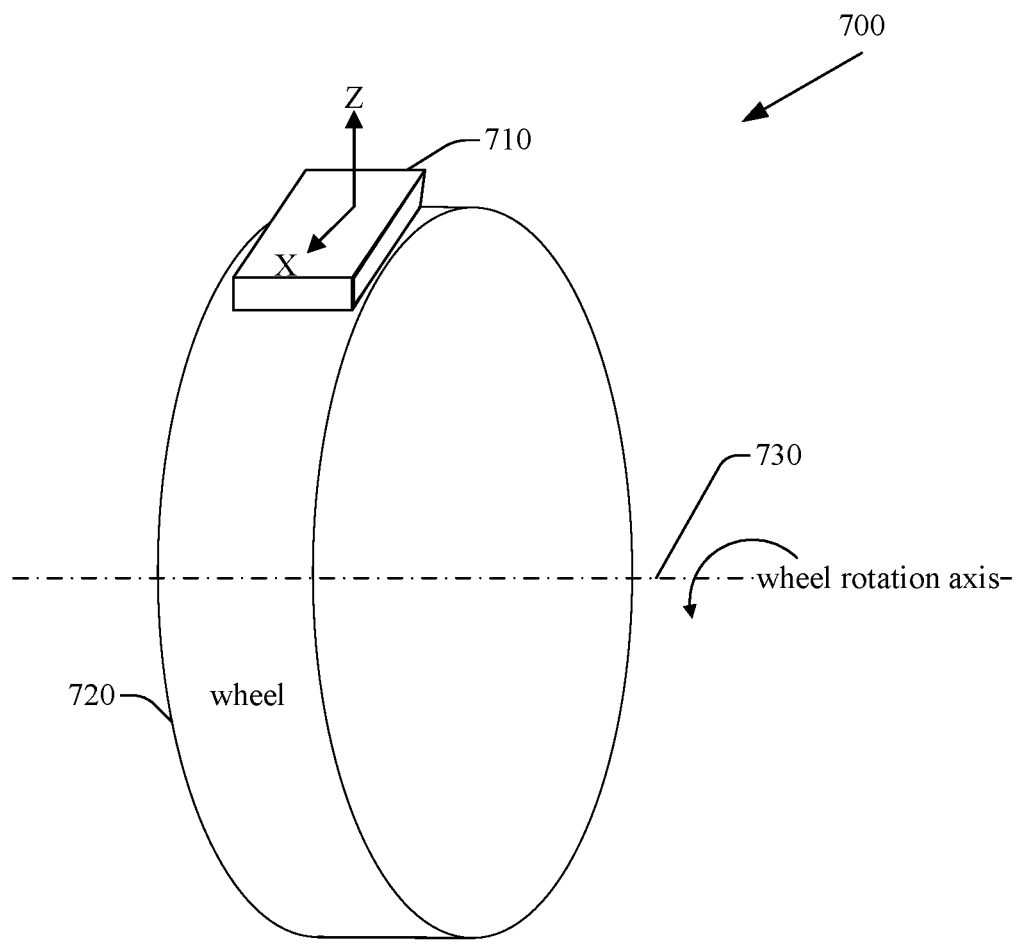
FIG. 7 illustrates a magnetic field sensor mounted on a wheel.

FIG. 7 illustrates an example wheel assembly 700 in which example embodiments may be implemented. Wheel assembly 700 includes a magnetic field sensor 710. Magnetic field sensor 710 is a single axis magnetic field sensor that measures the magnitude of the reference magnetic field in the x axis. Magnetic field sensor 710 is coupled to wheel 720. Wheel 720 rotates about the wheel orientation axis 730.

Figure 6:
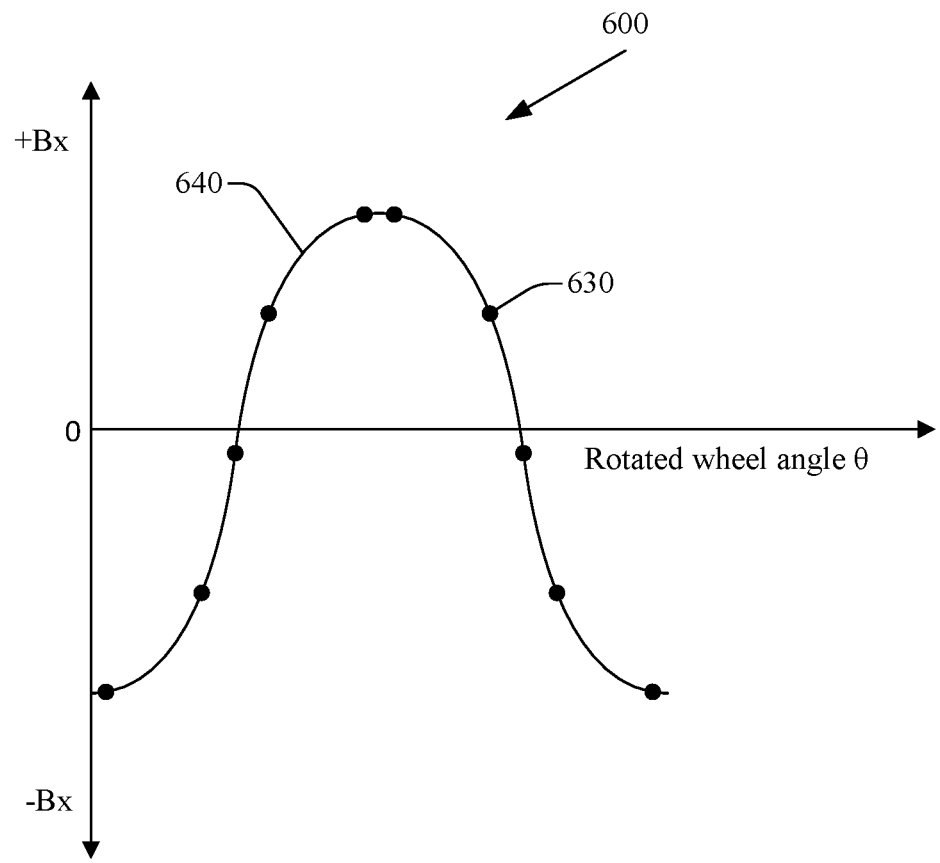
FIG. 6 illustrates a graph showing the oscillation of a magnitude of a component of a reference magnetic field versus an angular rotation angle of a wheel that changes over time.

Example embodiments calculate phase and frequency information from information about the magnetic field detected by the magnetic field sensor. For example, the magnetic field sensor may measure the magnitude of a component of the reference magnetic field at a point in time as the wheel rotates within the magnetic field. FIG. 6 illustrates a graph 600 that plots the magnitude of the reference magnetic field in the x axis. The vertical axis of the graph 600 represents the magnitude of the x-component Bx of the reference magnetic field. The horizontal axis of the graph 600 represents the angular rotation of the wheel. Points 630 indicate Bx measurement data obtained by a magnetic field sensor at points in time during the rotation of the wheel. Based on the collected data points 630, a curve 640 may be fitted to the points using non-linear sine function fitting. In one embodiment, a least square method may be used. In one embodiment, the sampling rate of the data points is known, and example embodiments may also compute a rotational frequency for the wheel based, at least in part, on the known sampling rate. Example embodiments may alter the sampling rate based on the number of axes being measured, a property of the magnetic field, or a user preference.

Figure 8:
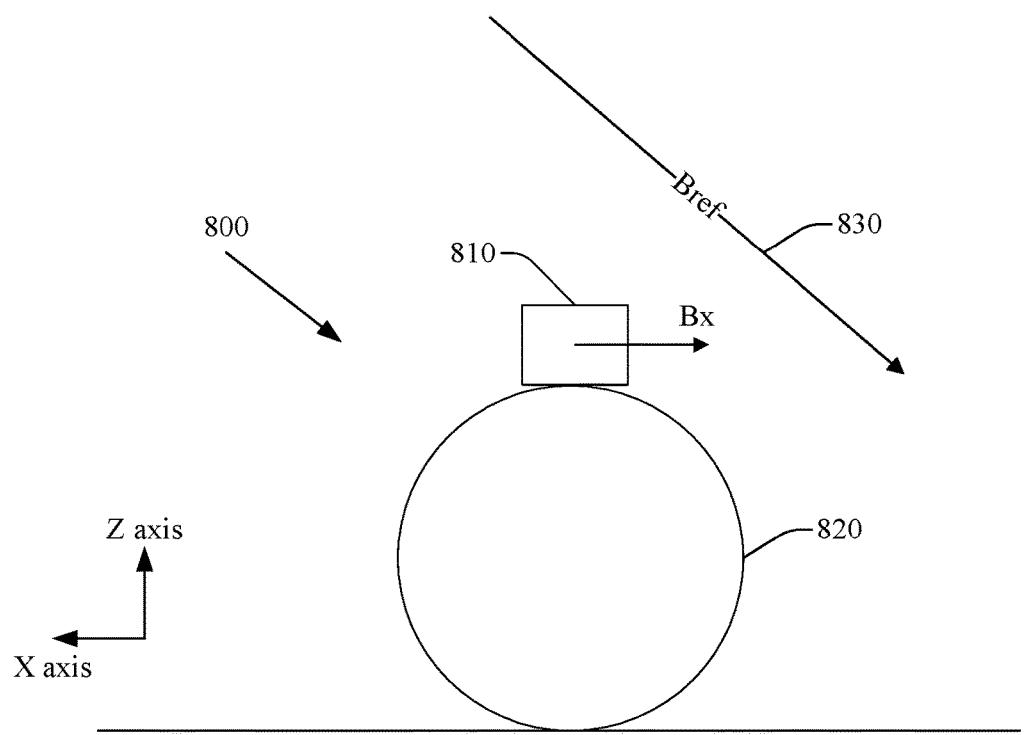
FIG. 8 illustrates a magnetic field sensor mounted on a wheel.
Figure 9:
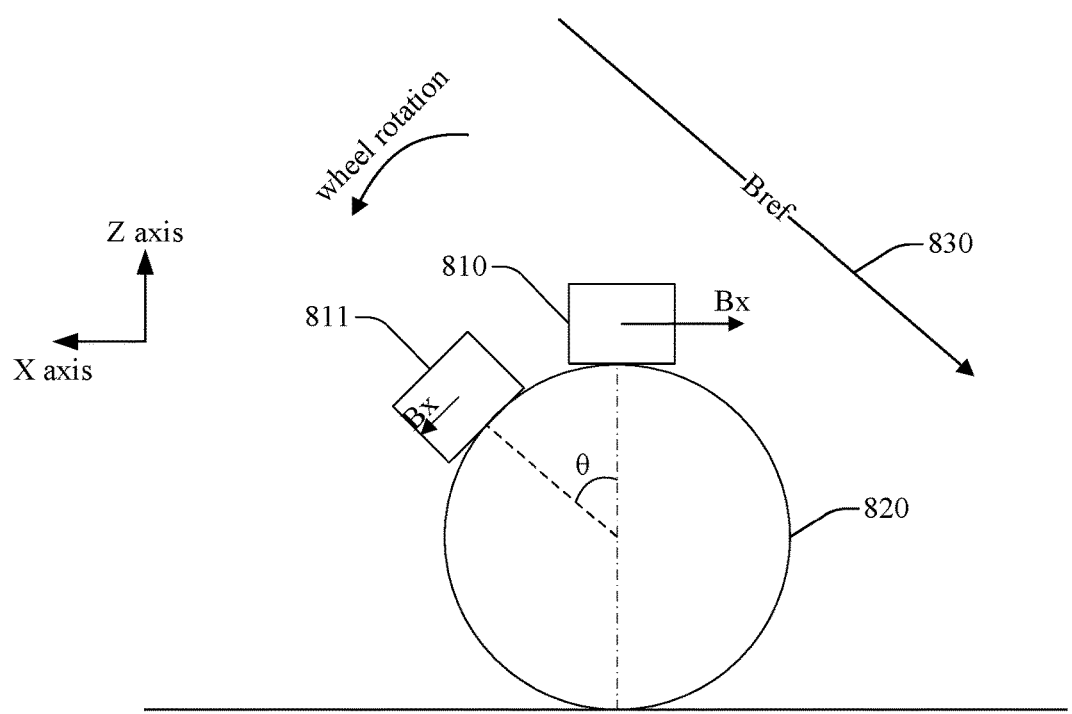
FIG. 9 illustrates a magnetic field sensor mounted on a wheel.

FIG. 8 illustrates an example wheel assembly 800 in which example embodiments may be implemented. Wheel assembly 800 includes a TPS 810 coupled to a wheel 820. TPS 810 may be coupled to a wheel rim, or may be located inside a tire coupled to the wheel rim. The TPS 810 includes a single axis magnetic field sensor that measures the magnetic field in the x axis. In this example, the TPS is aligned with magnetic north, while the z axis of the TPS is aligned anti-parallel with gravity. A reference magnetic field (e.g. the earth's magnetic field) is represented as Bref 830, and is measured in the x-axis as Bx by magnetic field sensor 810. FIG. 9 is similar to FIG. 8 but further illustrates the wheel assembly 800 of FIG. 8 after having rotated an arbitrary amount represented by angle $\theta$ The magnetic field sensor 810, having rotated to position 811, measures the reference magnetic field 830 in the x axis as Bx. At position 811, the magnitude of the x component of the reference magnetic field (e.g. Bx) will be different than at the starting position. As the wheel completes a rotation, the magnetic field sensor in TPS 810 will be aligned parallel to the reference magnetic field vector at one point of the rotation, and will be aligned anti-parallel at another point. Thus, the magnetic field sensor measures a sinusoidal signal ranging from −Bref to +Bref as it rotates, as illustrated in FIG. 6.

Example embodiments may employ multiple axis magnetic field sensors. X, y, and z components may be defined, upon which the reference magnetic field Bref vector 830 illustrated in FIGS. 8 and 9 may be expressed as [$B_{refx}$, 0, $B_{refz}$], in which the vehicle is aligned in the direction of magnetic north. Since Bx0 and Bz0 depend on a field intensity F of the reference magnetic field and an inclination angle $\phi_{inclination}$ of the reference magnetic field, Bref can be further expressed as $[B_x0=F*\cos(\phi_{inclination}), 0, B_z0=-F*\sin(\phi_{inclination})]$.

The direction of the vehicle may change from the reference position (e.g. 0, magnetic north) to another direction (e.g. $\phi$) by rotation about, in this example, the z axis. The Bref vector may be expressed as $[B_{refx}*\cos\phi, B_{refx}*\sin\phi, B_{refz}]$ at the new direction. Thus, when the wheel rotates about the y axis, Bx is dependent on the vehicle direction $\phi$ and the rotation angle $\theta$, and the resultant signal will be a sinusoidal signal dependent on rotation angle $\theta$ where the amplitude is dependent on the vehicle direction $\phi$. Bx may be expressed as:

$$B_x = B_{x0}*\cos(\theta)*\cos(\phi) - B_{z0}*\sin(\theta) \quad \text{(eq. 1)}$$

Thus, the relative phase information may be extracted from equation 1 as $$B_x = \sqrt{B_{z0}^2 + B_{x0}^2*\cos^2(\phi)}*\sin(\theta+x) \quad \text{(eq. 2)}$$

where $(\theta+x)$ represents the relative phase, and where tan $$(x) = \frac{B_{x0}*\cos(\theta)}{-B_{z0}}.$$

Consequently, the signal measured by the magnetic field sensor results in a non-zero sinusoidal wave at any arbitrary vehicle direction $\phi$ and rotation angle $\theta$ as long as Brefz is not zero at the reference position. The magnetic field vector detected by the magnetic field sensor may be a sum of several magnetic field sources. For example, in addition to the earth's magnetic field, there may be a stray magnetic field caused by ferrous material nearby the magnetic field sensor, including a wheel rim, a car body, or a car chassis. However, these stray fields are constant and do not significantly affect the sinusoidal signal. Rather, the stray fields may change the offset level of the sinusoidal wave. As the values of the stray fields may be known, example embodiments improve on conventional acceleration sensor based approaches that have wildly varying DC offsets due to mechanical noise and vibrations that are computationally costly to account for.

FIG. 1 illustrates an embodiment of a system 100 for locating a position of at least one out of a plurality of wheels of a vehicle. The system 100 comprises a detector 120 configured to obtain information related to a reference magnetic field. The information related to the reference magnetic field includes a magnitude of a component of the reference magnetic field through which the at least one wheel of the vehicle rotates. In one embodiment, the information related to the reference magnetic field includes phase information associated with the at least one wheel based, at least in part, on the magnitude of the component of the reference magnetic field. The system 100 further comprises an antilock braking system unit 130 configured to obtain information related to angular rotations of the plurality of wheels. The system 100 further comprises a locator circuit 120 configured to determine the position of the at least one wheel based on the information related to the magnitude of the component of the reference magnetic field of the at least one wheel and the information related to the angular rotations of the plurality of wheels. FIG. 1 further illustrates the detector 110 coupled to the locator circuit 120. Additionally, the antilock braking system unit 130 is coupled to the locator circuit 120.

In one embodiment, locator circuit 120 may be configured to obtain the position of the at least one wheel further based on predetermined positions associated with the plurality of wheels and the information related to the angular rotations of the plurality of wheels. Locator circuit 120 can be configured to determine the position of the at least one wheel by determining information related to a correlation of the information related to the magnitude of the component of the reference magnetic field of the at least one wheel and the information related to the angular rotations of the plurality of wheels of the vehicle. Locator circuit 120 may also be configured to determine the position of the at least one wheel based, at least in part, on the phase information associated with the at least one wheel.

In one embodiment, detector 110 may include magnetic field sensor 114. Magnetic field sensor 114 senses information related to the reference magnetic field through which the at least one wheel of the vehicle rotates. Magnetic field sensor 114 may be a single axis magnetic field sensor, a dual-axis magnetic field sensor, or a three axis magnetic field sensor. Magnetic field sensor 114 may comprise a semiconductor chip including at least one magnetoresistive or Hall sensor element. The magnetic field sensor 114 may be a Hall effect sensor, a GMR sensor, a TMR sensor, a CMR sensor, an AMR sensor, or any other form of magnetoresistive sensor element.

The detector 110 may comprise a tire pressure sensor 116. Tire pressure sensor 116 may be a surface microelectromechanical system (MEMS) capacitive pressure cell, or other type of pressure sensor. Detector 110 may be further configured to obtain information related to a tire pressure of the at least one wheel and hence the locator 120 can be further configured to associate the information related to the tire pressure with the position of the at least one wheel.

FIG. 1 further illustrates sensors 132 which may be included in the ABS unit 130. ABS unit 130 may include one or more ABS sensors 132 to obtain information related to the angular rotations of the plurality of wheels. Finally, FIG. 1 also shows that there may be radio communication between locator circuit 120 and detector 110. Detector 110 may comprise transmitter components such as a transmit antenna or loop, a radio frequency oscillator, a mixer, a power amplifier, or other transmitted components. Correspondingly, locator circuit 120 may comprise receiver components, including one or more receive antennas or loops, one or more filters, one or more oscillators, a low-noise amplifier, a converter, a mixer, or other receiver component.

Figure 2:
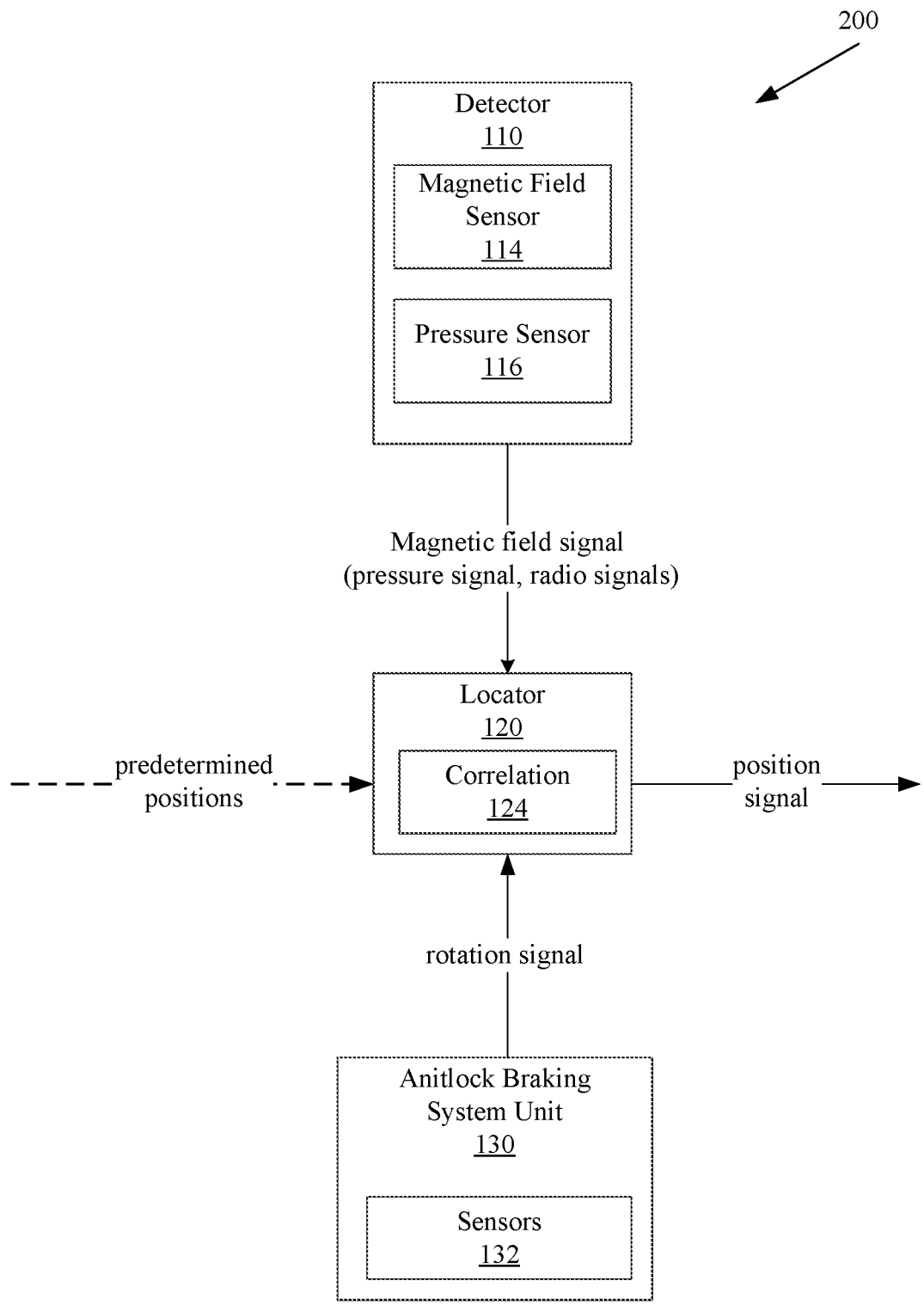
FIG. 2 illustrates an embodiment of a wheel localizer.

FIG. 2 illustrates an embodiment of a wheel localizer 200 for locating a position of at least one out of a plurality of wheels of a vehicle. Wheel localizer 200 comprises a detector 110 which is coupled to a locator circuit 120. Wheel localizer 200 comprises an ABS unit 130 which is also coupled to locator circuit 120. Detector 110 is configured to provide a magnetic field signal associated with the at least one wheel of the vehicle to locator circuit 120. ABS unit 130 is configured to provide the rotation signal comprising information related to angular rotations of the plurality of wheels to the locator circuit 120. Locator circuit 120 is configured to receive the magnetic field signal and the rotation signal and to further provide a position signal comprising information related to the position of the at least one wheel based on the magnetic field signal and the rotation signal.

Locator circuit 120 may be further configured to provide the position signal further based on predetermined positions associated with the plurality of wheels and the information related to the angular rotations of the plurality of wheels, as indicated by the dashed line in FIG. 2. Detector 110 may comprise a magnetic field sensor 114, which may be a Hall effect sensor, a GMR sensor, a TMR sensor, a CMR sensor, an AMR sensor, or any other form of magnetoresistive sensor element. The magnetic field sensor 114 is configured to sense information related to a magnitude of a component of the reference magnetic field through which the at least one wheel of the vehicle rotates. Detector 110 may compute phase information associated with the at least one wheel based, at least in part, on the information related to the magnitude of the component of the reference magnetic field. The magnetic field signal associated with the at least one wheel may include the phase information. As further indicated in FIG. 2, locator circuit 120 can be configured to determine the information related to the position of the at least one wheel by determining information related to a correlation 124 of the information related to the magnetic field associated with the at least one wheel and the information related to the angular rotations of the plurality of wheels of the vehicle. Furthermore, ABS unit 130 may comprise one or more ABS sensors 132 to obtain the rotation signal. Locator circuit 120 may also be configured to receive a pressure signal from the detector 110 comprising information related to a tire pressure of the at least one wheel. Locator circuit 120 may be further configured to associate the information related to the tire pressure with the position signal. Correspondingly, detector 110 may further comprise a pressure sensor 116 for generating the pressure signal. Detector 110 and locator circuit 120 can be accordingly configured to exchange the respective information using radio signals as described above.

Figure 3:
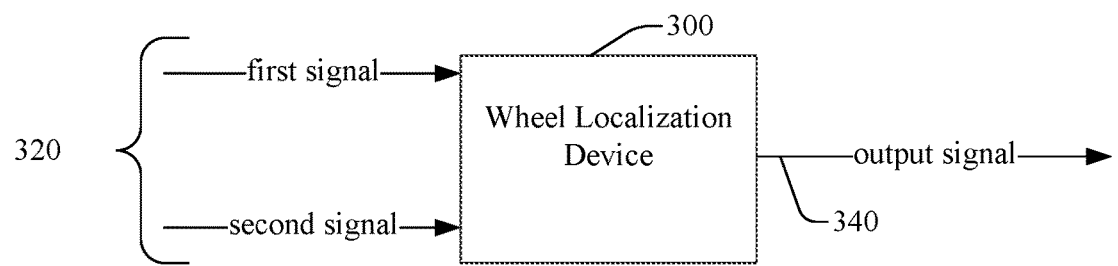
FIG. 3 illustrates an embodiment of a wheel localization device.

FIG. 3 illustrates an embodiment of a wheel localization device 300 for locating a position of at least one out of a plurality of wheels of a vehicle. Wheel localization device 300 is suitable for implementation with example systems, localizers, and methods described herein. Wheel localization device 300 comprises one or more inputs 320 for a first signal including information related to a magnetic field through which the at least one wheel of the vehicle rotates, and for one or more second signals. The first signal may also include phase information associated with the at least one wheel, where the phase information is based, at least in part, on the information related to the magnetic field. The one or more second signals may include information related to angular rotations of the plurality of wheels. Wheel localization device 300 also comprises an output 340 for an output signal comprising information related to the position of the wheel. The output signal is based on the first signal comprising the information related to the magnetic field through which the at least one wheel of the vehicle rotates and on the one or more second signals comprising the information related to the angular rotations of the plurality of wheels. The output signal may also be further based on the phase information. In one embodiment, the output signal may include information related to an association of the first signal to one of the angular rotations of the plurality of wheels. In one embodiment the wheel localization device is implemented as a single chip.

Figure 4:
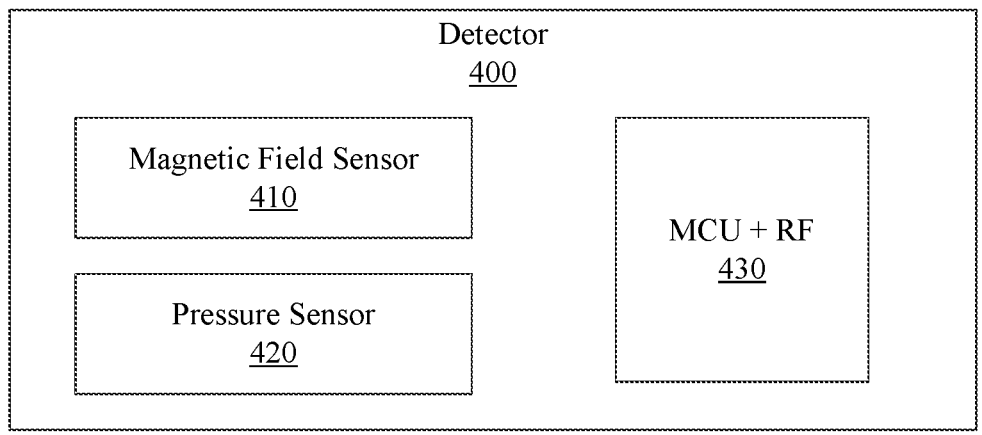
FIG. 4 illustrates an embodiment of a TPS device comprising a magnetic field sensor.

FIG. 4 illustrates an embodiment of an architecture of a single-die integrated TPS device comprising a detector 400 suitable for implementation with example systems, localizers, devices, and methods described herein. For example, detector 400 may be implemented as element 110 of FIG. 1, or element 110 of FIG. 2. Detector 400 includes a magnetic field sensor 410. Detector 400 also includes a tire pressure sensor 420. Tire pressure sensor 420 may include a surface MEMS capacitive pressure cell. Detector 400 also includes a microcontroller (MCU) and radio frequency (RF) unit 430. Detector 400 may comprise a PCB upon which magnetic field sensor 410, MEMS capacitive pressure cell 420, and MCU+RF unit 430 are coupled. Detector 400 may be mounted on a wheel, on a wheel rim, or inside a tire. In other embodiments, other types of pressure cells may be used.

Embodiments, including system 100, wheel localizer 200, and other embodiments described herein, may be battery powered. Energy efficient operation may be desirable for a battery powered device. Some embodiments described herein use wheel sensor systems that use information about a reference magnetic field in order to determine whether the system or wheel is in motion or not. If little or no change in the magnitude of a component of the reference magnetic field is determined, the system may be switched into a standby mode or energy efficient mode. Example embodiments may store an actual change in the magnitude of the component of the reference magnetic field in a memory. With the stored value, the system can wake up and measure another change in the magnitude of the component of the reference magnetic field. If the magnitude of the component of the reference magnetic field does not change or does not change more than a certain threshold, the system may enter a standby or energy efficient mode. If changes in the magnitude of the component of the reference magnetic field above a threshold magnitude level are detected, the system may be switched into measurement mode or run mode.

Embodiments provide a system for determining a change in the magnitude of a component of the reference magnetic field through which a wheel of a vehicle rotates. The system comprises a magnetic field sensor configured to determine information related to the magnetic field through which the wheel rotates. In embodiments, the magnetic field sensor may be implemented as a one axis magnetic field sensor, a dual axis magnetic field sensor, or a three axis magnetic field sensor. The system further comprises a memory unit configured to store information related to the magnetic field. The memory may be volatile or non-volatile. The memory may be a Random Access Memory (RAM), an Electronically Erasable Programmable Read-Only Memory (EEPROM), static RAM (SRAM), dynamic RAM (DRAM), or other form of RAM. The memory can, for example, be battery powered as well. The system may further comprise a control unit which can be implemented as a control device, a control module, a controller, any means for controlling, a processor, or a microprocessor.

The control unit is configured to compare stored information related to a past change in the magnitude of the component of the reference magnetic field of the wheel with more recent information related to a more recent change in the magnitude of the component of the reference magnetic field of the wheel. The control unit operates the system in a standby mode when the stored information differs from the recent information by less than a predetermined threshold. The magnitude of the component of the reference magnetic field may be measured at different times. A measurement at the first time is stored in the memory. At a later time, a second measurement is taken and compared to the first measurement. If the difference between the two measurements lies below the threshold, which can be set in a predetermined way, or which may be dynamically adjusted, the system is operated in standby mode. If changes greater than or equal to the threshold of the magnitude of the component of the reference magnetic field are detected, the system can be switched into a measurement mode and provide more frequent measurements than in the standby mode. The time period between the first time and the second time, i.e. the wake-up settings for the above comparisons, may be preset as well, may be dynamically adaptable, or may be user adjustable. The wake-up intervals in standby mode can be adjusted and the corresponding energy consumption may be reduced compared to conventional approaches.

Figure 5:
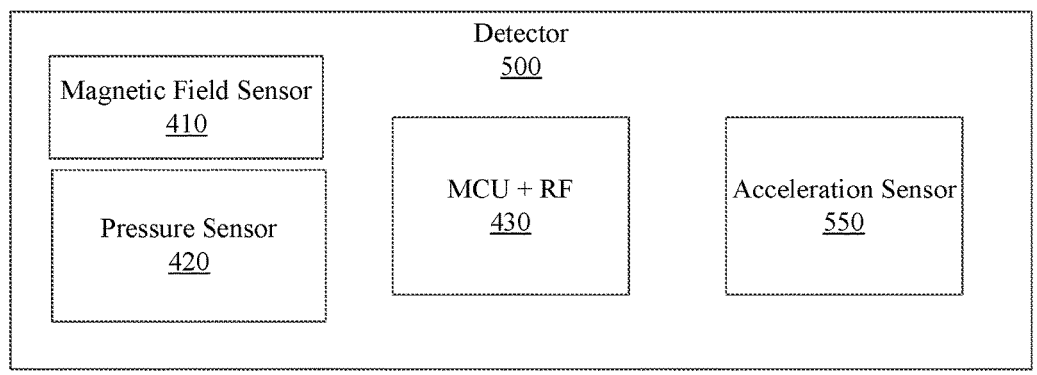
FIG. 5 illustrates an embodiment of a TPS device comprising a magnetic field sensor.

FIG. 5 illustrates an embodiment of an architecture of a single-die integrated TPS device 500. Detector 500 is similar to detector 400 illustrated in FIG. 4, but includes additional components. Detector 500 includes acceleration sensor 550. Acceleration sensor 550 may detect a tangential acceleration of at least one of a plurality of wheels of a vehicle. Acceleration sensor 550 may be used to detect a motion of the at least one of a plurality of wheels of a vehicle. Acceleration sensor 550 may detect a motion of the at least one of the plurality of wheels to wake up a TPMS system from a sleep state as described above with respect to detection of changes in the magnitude of a component of the reference magnetic field through which a wheel of a vehicle rotates.

In one embodiment, a TPS periodically wakes up to detect a vehicle motion by measuring an acceleration detected by acceleration sensor 550. A wakeup can be carried out from a parking state of the vehicle. If the TPS detects an acceleration of centrifugal force in parking mode, it may go into a run mode or a rolling state from parking state, upon determining that a centrifugal acceleration means that the wheels are rotating and the vehicle is moving. In some embodiments, a single axis tangential sensor may be used as acceleration sensor, which may not be able to detect centrifugal acceleration but only the acceleration induced by earth's gravity depending on the angular position of the TPS. Embodiments may make use of other, different techniques for detecting the rolling of a wheel from parking state to a moving state.

When a TPS goes into a stationary state or parking state, the TPS may store the later stationary g or acceleration value, or change in the magnitude of the component of the reference magnetic field value, to a battery-powered memory unit which may be implemented as a random access memory (RAM). This value is referred to as Ax(i−1). In the stationary state, the TPS performs a periodic wakeup to detect a motion. When the TPS is woken up in the stationary step, the TPS measures one sample, which is referred to as Ax(i). Then, a control unit in the TPS may compare this recent acceleration value or the recent component of the magnetic field value with the stored acceleration value, or stored component of the magnetic field value, Ax(i−1) as stored in the RAM. If the magnitude of Ax(i)-Ax(i−1) is less than a threshold, where some tolerance is allowed due to, for example, temperature drifts, the vehicle is very likely to be still in a stationary state. The TPS can then return to power down mode, when a measurement has been carried out. In some embodiments just a single measurement may be carried out. Prior to powering down, the TPS may store the recent acceleration value or recent component of the magnetic field value for a future comparison.

If Ax(i) is different from Ax(i−1), example embodiments may determine that the vehicle is moving. In this case the TPS may measure tangential acceleration samples or a component of the magnetic field samples to estimate the speed by measuring the period or frequency of oscillation. Then, if the estimated speed exceeds the threshold, where the threshold can be defined by the TPMS application, or by a user, the TPS goes into a rolling or active state. Upon detecting that the speed falls below the threshold, the TPS may go back to power down or energy efficient mode. In one embodiment, once the threshold is exceeded, the APS may switch to run mode without considering the speed threshold. In another embodiment, in standby mode the TPS may wake up frequently. The period between such wakeups can be preset. For example, the period between wakeups may correspond to one second, ten seconds, thirty seconds, or another amount.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 10:
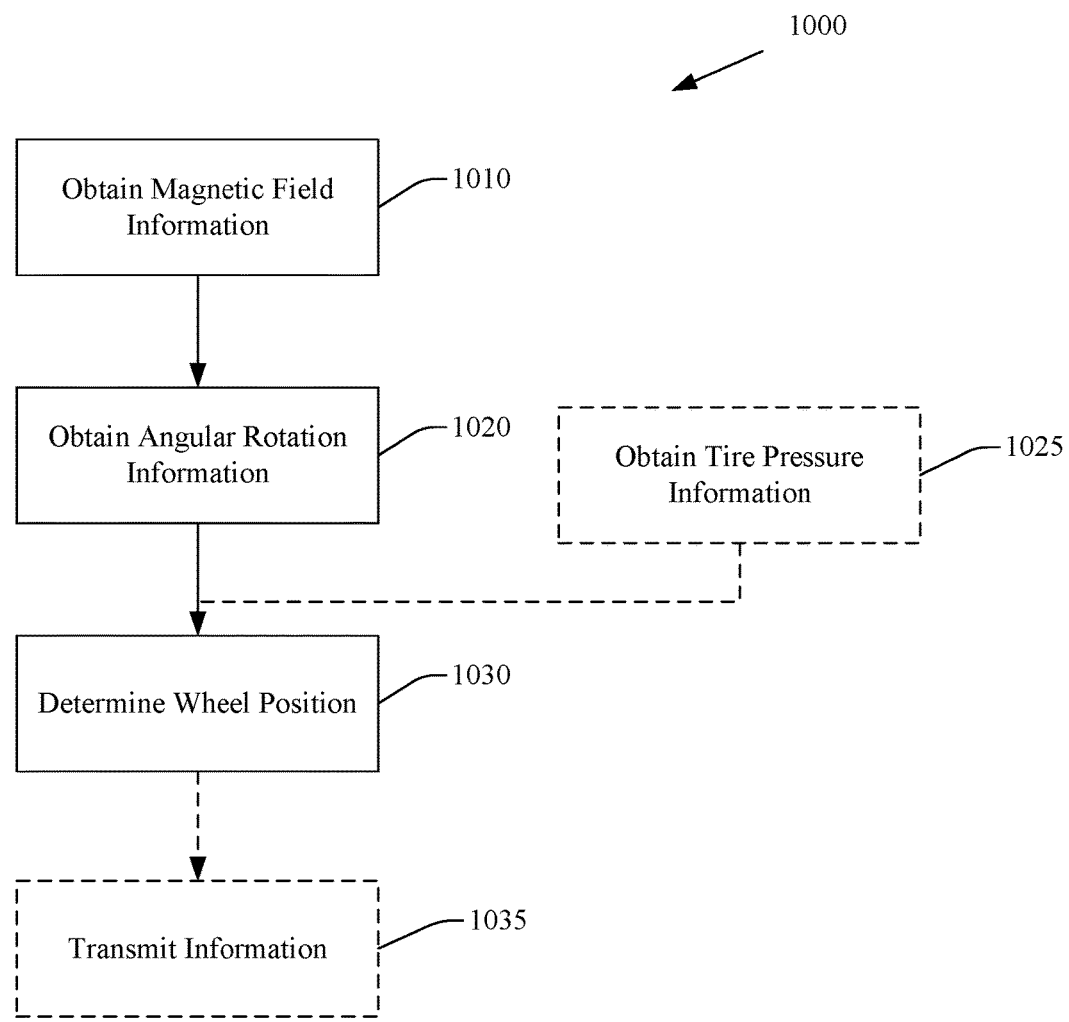
FIG. 10 is a flow diagram of a method for locating a position of a wheel.

FIG. 10 illustrates a method 1000 for locating a position of at least one wheel out of a plurality of wheels of a vehicle using a wheel localizer. Method 1000 includes, at 1010, obtaining information related to a magnetic field. The information may be obtained via the wheel localizer. The magnetic field may be a reference magnetic field through which the at least one wheel rotates. The magnetic field may include the Earth's magnetic field, or other magnetic fields. The information may include a magnitude of a component of the magnetic field. The information may also include phase information associated with the at least one wheel based, at least in part, on the magnitude of the component of the magnetic field. The wheel localizer comprises a magnetic field sensor. In one embodiment, the magnetic field sensor is a single axis magnetic field sensor, a dual-axis magnetic field sensor, or a three-axis magnetic field sensor. The magnetic field sensor may detect a magnitude of a component of the magnetic field in an axis. The magnetic field sensor may be a TMR sensor, a GMR sensor, an AMR sensor, a CMR sensor, or a Hall-effect sensor.

Method 1000 also includes, at 1020, obtaining, via the wheel localizer from an ABS unit, information related to angular rotations of the plurality of wheels.

Method 1000 also includes, at 1030 determining, via the wheel localizer, the position of the at least one wheel. Method 1030 determines the position of the at least one wheel based on the information related to the magnetic field through which the at least one wheel rotates and the information related to the angular rotations of the plurality of wheels. The position comprises a wheel location from among the plurality of wheels. In one embodiment, determining the position of the at least one wheel is further based on predetermined positions associated with the plurality of wheels and the information related to the angular rotations of the plurality of wheels. In another embodiment, determining the position of the at least one wheel further comprises determining information related to a correlation of the information related to the magnetic field and the information related to the angular rotations of the plurality of wheels of the vehicle.

In one embodiment, method 1000 may also include, at 1025 obtaining information related to a tire pressure of the at least one wheel. Method 1000 may further include associating the information related to the tire pressure with the position of the at least one wheel.

In one embodiment, method 1000 also comprises, at 1035, transmitting information using a radio signal and receiving the information from the radio signal. The information comprises the information related to the magnetic field, the information information related to angular rotations of the plurality of wheels, the information related to the correlation of the information related to the magnetic field and the information related to the angular rotations of the plurality of wheels, or the information related to the tire pressure of the at least one wheel. In another embodiment, method 1000 may also comprise transmitting other, different information.

Embodiments may provide computer-executable instructions stored on a non-transitory computer-readable media for performing, when the computer executable instructions are executed by a computer, by a processor or by corresponding hardware, one of the above-described methods.

One of ordinary skill in the art would readily recognize that acts of various above-described methods may be performed by programmed computers. Some embodiments are also intended to cover program storage devices, e.g., digital data storage media, which are machine or computer readable and encode machine-executable or computer-executable programs of instructions, where the instructions perform some or all of the steps of the above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods or (field) programmable logic arrays ((F)PLAs) or (field) programmable gate arrays ((F)PGAs), programmed to perform said steps of the above-described methods.

Methods, systems, devices, localizers, and other embodiments described herein are described with reference to the drawings in which like reference numerals are used to refer to like elements throughout, and where the illustrated structures are not necessarily drawn to scale. Embodiments are to cover all modifications, equivalents, and alternatives falling within the scope of the invention. In the figures, the thicknesses of lines, layers and/or regions may be exaggerated for clarity. Nothing in this detailed description (or drawings included herewith) is admitted as prior art.

Like numbers refer to like or similar elements throughout the description of the figures. When an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the above description some components may be displayed in multiple figures carrying the same reference signs, but may not be described multiple times in detail. A detailed description of a component may then apply to that component for all its occurrences.

"Computer-readable storage medium", as used herein, refers to a non-transitory medium that stores instructions or data. "Computer-readable storage medium" does not refer to propagated signals. A computer-readable storage medium may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

In regard to the various functions performed by the above described components or structures (blocks, units, assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A system for determining a position of at least one wheel out of a plurality of wheels of a vehicle, comprising:
    a detector that obtains information related to a reference magnetic field in which the at least one wheel rotates;
    an antilock braking system (ABS) unit that obtains information related to angular rotations of the plurality of wheels; and
    a locator circuit that determines the position of the at least one wheel based, at least in part, on the information related to the reference magnetic field and the information related to the angular rotations of the plurality of wheels, where the position comprises a wheel location from among the plurality of wheels.

2. The system of claim 1, where the reference magnetic field comprises the earth's magnetic field.

3. The system of claim 1, where the detector comprises a magnetic field sensor that senses a magnitude of a component of the reference magnetic field in an axis.

4. The system of claim 3, where the magnetic field sensor is a single axis magnetic field sensor, a two-axis magnetic field sensor, or a three-axis magnetic field sensor.

5. The system of claim 4, where the magnetic field sensor is a tunneling magnetoresistance (TMR) sensor, a giant magnetoresistance (GMR) sensor, an anisotropic magnetoresistance (AMR) sensor, a colossal magnetorsistance (CMR) sensor, or a Hall-effect sensor.

6. The system of claim 1, where the locator circuit determines the position of the at least one wheel by determining information related to a correlation of the information related to the reference magnetic field with the information related to the angular rotations of the plurality of wheels.

7. The system of claim 1, where the ABS unit comprises one or more ABS sensors that obtain the information related to the angular rotations of the plurality of wheels.

8. The system of claim 1, where the detector obtains information related to a tire pressure of the at least one wheel and where the locator circuit associates the information related to the tire pressure with the position of the at least one wheel.

9. The system of claim 1, where the detector further comprises a tire pressure sensor.

10. The system of claim 9, where the tire pressure sensor comprises a surface microelectromechanical system (MEMS) pressure cell that obtains information related to a tire pressure of the at least one wheel.

11. The system of claim 1, where the detector transmits information, including at least the information related to the reference magnetic field, using a radio signal, and where the locator receives the information from the radio signal.

12. A wheel localizer for determining a position of at least one wheel out of a plurality of wheels of a vehicle, the localizer comprising:
    a detector that provides a magnetic field signal comprising information related to a reference magnetic field detected by a magnetic field sensor associated with the at least one wheel;
    an antilock braking system (ABS) unit that provides a rotation signal comprising information related to angular rotations of the plurality of wheels;
    a tire pressure sensor that provides a pressure signal comprising information related to a tire pressure of the at least one wheel; and
    a locator circuit that receives the magnetic field signal, the rotation signal, and the pressure signal, and that provides a position signal comprising information related to the position of the at least one wheel based on the magnetic field signal and the rotation signal, where the position comprises a wheel location from among the plurality of wheels, and where the locator circuit associates the information related to the tire pressure with the position signal.

13. The wheel localizer of claim 12, where the locator circuit provides the position signal further based on predetermined positions associated with the plurality of wheels and the information related to the angular rotations of the plurality of wheels.

14. The wheel localizer of claim 12, where the magnetic field sensor senses information related to a magnitude of a component of the reference magnetic field, where the at least one wheel rotates through the reference magnetic field.

15. The wheel localizer of claim 14, where the magnetic field sensor is a tunneling magnetoresistance (TMR) sensor, a giant magnetoresistance (GMR) sensor, an anisotropic magnetoresistance (AMR) sensor, a colossal magnetorsistance (CMR) sensor, or a Hall-effect sensor, and where the magnetic field sensor senses information related to a magnitude of a component of the reference magnetic field in one axis, in two axes, or in three axes.

16. The wheel localizer of claim 12, where the locator circuit determines the information related to the position of the at least one wheel by determining information related to a correlation of the information related to the magnitude of the component of the reference magnetic field associated with the at least one wheel and the information related to the angular rotations of the plurality of wheels of the vehicle.

17. The wheel localizer of claim 12, where the ABS unit comprises one or more ABS sensors that obtain the rotation signal.

18. A wheel localization device for determining a position of at least one wheel out of a plurality of wheels of a vehicle, comprising:
    one or more inputs configured to receive a first signal comprising information related to a magnetic field through which the at least one wheel rotates and configured to receive one or more second signals comprising information related to angular rotations of the plurality of wheels obtained from an antilock braking system unit; and an output configured to provide an output signal comprising information related to the position of the wheel, where the output signal is based on the first signal comprising the information related to the magnetic field through which the at least one wheel rotates and the one or more second signals comprising the information related to the plurality of wheels, where the position comprises a wheel location from among the plurality of wheels.

19. The wheel localization device of claim 18, where the output signal comprises information related to an association of the first signal to one of the angular rotations of the plurality of wheels.

20. A method for determining a position of at least one wheel out of a plurality of wheels of a vehicle using a wheel localizer, the method comprising:
obtaining, via the wheel localizer, information related to a reference magnetic field through which the at least one wheel rotates;
obtaining, via the wheel localizer from an antilock braking system (ABS) unit, information related to angular rotations of the plurality of wheels; and
determining, via the wheel localizer, the position of the at least one wheel based on the information related to the reference magnetic field of the at least one wheel and the information related to the angular rotations of the plurality of wheels, where the position comprises a wheel location from among the plurality of wheel;
where the wheel localizer comprises a magnetic field sensor.

21. The method of claim 20, where determining the position of the at least one wheel is further based on predetermined positions associated with the plurality of wheels and the information related to the angular rotations of the plurality of wheels.

22. The method of claim 20, where determining the position of the at least one wheel further comprises determining information related to a correlation of the information related to the reference magnetic field and the information related to the angular rotations of the plurality of wheels of the vehicle.

23. The method of claim 20, further comprising obtaining information related to a tire pressure of the at least one wheel, and associating the information related to the tire pressure with the position of the at least one wheel.

24. The method of claim 20, further comprising transmitting information using a radio signal and receiving the information from the radio signal, where the information comprises the information related to the reference magnetic field, the information information related to angular rotations of the plurality of wheels, the information related to the correlation of the information related to the reference magnetic field and the information related to the angular rotations of the plurality of wheels, or the information related to the tire pressure of the at least one wheel.

25. The method of claim 20, where the magnetic field sensor is a single axis magnetic field sensor, a dual-axis magnetic field sensor, or a three-axis magnetic field sensor, and where the information related to the reference magnetic field comprises a magnitude of a component of the reference magnetic field in an axis.

26. The method of claim 25, where the magnetic field sensor is a tunneling magnetoresistance (TMR) sensor, a giant magnetoresistance (GMR) sensor, an anisotropic magnetoresistance (AMR) sensor, a colossal magnetorsistance (CMR) sensor, or a Hall-effect sensor.

27. The method of claim 20, where the reference magnetic field comprises the magnetic field of the earth.

* * * * *

UNITED STATES PATENT AND TRADEMARK OFFICE
CERTIFICATE OF CORRECTION

PATENT NO. : 10,281,298 B2
APPLICATION NO. : 15/217245
DATED : May 7, 2019
INVENTOR(S) : Park et al.

Page 1 of 1

It is certified that error appears in the above-identified patent and that said Letters Patent is hereby corrected as shown below:

In the Claims

Claim 24, Line 5: Replace "information information" with –"information"–

Signed and Sealed this
Thirtieth Day of July, 2019

Andrei Iancu
*Director of the United States Patent and Trademark Office*